J. B. WIARD.
DYNAMO ELECTRIC MACHINE.
APPLICATION FILED SEPT. 15, 1919.
1,360,482.
Patented Nov. 30, 1920.
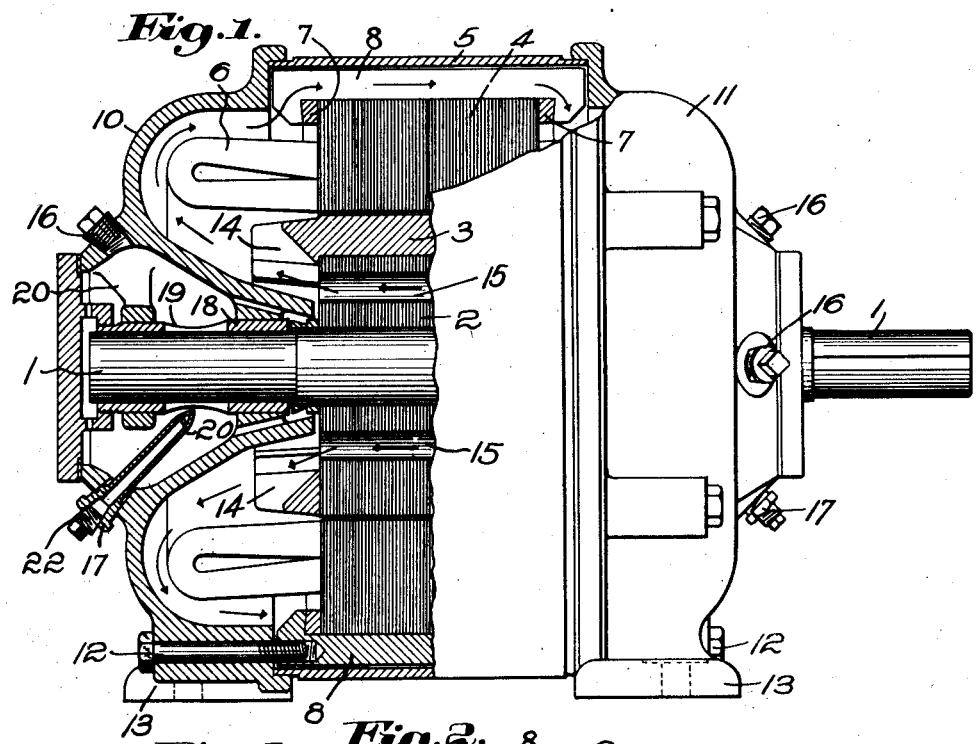
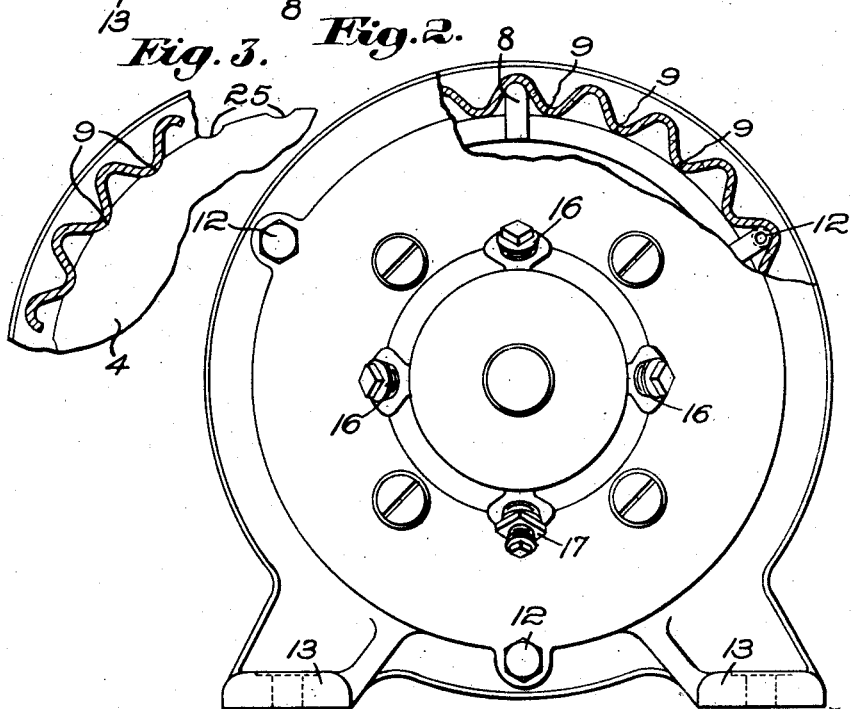
Inventor:
John B. Wiard,
by Emery Booth Janney Varney Attys

UNITED STATES PATENT OFFICE.

JOHN B. WIARD, OF LYNN, MASSACHUSETTS.

DYNAMO-ELECTRIC MACHINE.

1,360,482.  Specification of Letters Patent.  Patented Nov. 30, 1920.

Application filed September 15, 1919. Serial No. 323,855.

*To all whom it may concern:*

Be it known that I, JOHN B. WIARD, a citizen of the United States, and a resident of Lynn, in the county of Essex and State of Massachusetts, have invented an Improvement in Dynamo-Electric Machines, of which the following description, in connection with the accompanying drawings, is a specification, like characters on the drawings representing like parts.

This invention relates to dynamo electric machines and more particularly to improvements in the construction of such machines. While the invention is herein shown as embodied in an induction motor, it may have useful application to generators as well as motors and to dynamo electric machines both of the direct and alternating current type.

The invention will be best understood by reference to the following description when taken in connection with the accompanying illustration of one specific embodiment thereof, while its scope will be more particularly pointed out in the appended claims.

In the drawings:

Figure 1 is an elevation, shown partly in central longitudinal section, of an induction motor embodying one form of the invention;

Fig. 2 is a side elevation, partly broken away, showing the motor illustrated in Fig. 1; and Fig. 3 is a detail showing a modified form of construction.

Referring to the drawings and to the embodiment of the invention which is chosen for illustrative purposes, the motor is provided with the rotor 2 including the shaft 1 and the squirrel cage winding 3. This mounted to rotate within a stator which, as usual, is of laminated iron construction formed of a plurality of annular sheet metal plates 4 held together within a casing 5 and provided with the usual windings 6.

In the construction of inclosed induction motors it has been a common practice to assemble the annular sheet metal members by pressing the same into plain sheet metal casings or into cast shells and afterward machining the ends for the reception of end shields or bearing brackets. This construction requires an accurate maintenance of the stator core diameter as well as the inside diameter of the cylindrical shell or casing referred to in order that the sheet punchings comprising the stator core may fit accurately and press in tightly. The production of these diameters is expensive and troublesome.

In the construction shown in the drawings I have not only provided a casing which is relatively light while at the same time structurally strong and efficient; but have also provided a means for assembling the stator core within a casing without the necessity for the maintenance of such accurate diameters as has heretofore been necessary. In the production of the specific type of motor herein illustrated, the stator core 4 is first assembled and the punchings are tightly pressed together under heavy pressure in a suitable jig. A ring 7 of suitable stiffness and of substantially the same external diameter as that of the stator core is then applied to each outside face of the assembled stator core while the structure is still under pressure; and one or more (herein six) clamping devices, which are herein shown in the form of rigid U-shaped clamps 8, are forced into position so as to straddle the periphery of the core and firmly clamp the core together by the gripping pressure of their legs which bear against the ring 7.

While the pressure within the stator core is thus maintained by means of the clamps above referred to, the casing 5 is forced on the outside periphery of the core. The casing 5, as indicated in Fig. 2, is of such construction that it has a measure of flexibility, that is to say, it is capable of expanding slightly and symmetrically. Such condition, for example, can be readily secured by providing a casing of sheet steel or other suitable material, and of appropriate thickness, having longitudinal corrugations as indicated in the drawings. This provides a very stiff casing or shell and, by making the free internal diameter slightly less than that of the exterior part of the core, when the latter is forced into the casing the casing will expand slightly and symmetrically, firmly gripping the core at the detached points of gripping contact presented by the corrugations at 9—9 etc.

The structure may be then removed from the jig and mounted on an expanding arbor, and the side and peripheral edges of the casing machined so as to receive the end shields 10 and 11.

By suitably proportioning the internal free diameter of the corrugated holder and the thickness and size or shape of the corrugations, the latter will be given an inherent flexibility which will grip the stator core with any desired pressure but under a certain limiting pressure which, if exceeded, will merely result in stretching the corrugated strip of which the holder or casing is composed, the latter being capable of expansion or stretching circumferentially of the core. That is to say, the structure may be sufficiently elastic for purposes of assemblage but sufficiently rigid to serve its purpose when assembled and with a limit on the gripping pressure exerted so that it cannot act to throw the core punchings out of shape.

In the construction shown in Fig. 2 the stator core is held against angular displacement within the corrugated casing solely by the frictional grip of the corrugations against the core punchings. If it is desired to increase the resistance of the core against turning or angular displacements such, for example, as might arise through the torque exerted by the motor in the case of motors of relatively large capacity, some means may be employed for preventing the core from turning in addition to the frictional grip of the corrugations. This may be accomplished, for example, by punching slight indentations on the outer periphery of the stator punchings, which indentations are adapted to register with and receive the corrugations to a sufficient depth to prevent any turning movement under the ordinary torsional stresses likely to be applied to the stator. In Fig. 3 I have indicated the punchings 4 as of slightly greater diameter than those shown in Fig. 2 and provided at their periphery with suitably spaced and shaped indentations 25 into which the corrugations 9 fit when the casing is forced over the periphery of the core.

It will be seen that the corrugations in the casing provide recesses which extend lengthwise of the same and into which the U-shaped clamps 8 are adapted to enter without interference with the casing. In order to secure the end shields to the casing, any suitable fastenings may be employed. Herein the ends of several of the clamps 8 are threaded to receive cap-screw bolts 12, the latter passing through the end shield castings and serving to clamp the end shields to the stator. Three such clamp screws are shown on each end shield although any desired number may be employed.

While suitable supports may be attached to the casing if desired, herein supporting feet 13 are shown as secured to or formed integrally with the end shields. The latter may be assembled in any one of several different positions by removing the cap screws 12 and turning the end shields about the stator so that the terminal leads can project at different points relative to the position assumed by the feet and convenient for wiring in any particular installation.

The resulting structure is strong and light, economical in the use of metal, and is also relatively inexpensive since, as previously stated, it requires no accurate maintenance of stator core diameters or shell diameters.

The corrugated casing illustrated provides a series of elements of channel-like cross section extending length-wise the stator and maintaining a fixed relation between the stator core and the casing and end shields. This provides a construction well adapted to maintain the rigidity of the end shields and the alinement of the bearings with relation to the stator core.

While the invention is described as embodied specifically in a motor employing a stator core composed of laminated sheet metal members, it is not limited to a core of that construction and a casing of the character described may be employed to advantage in connection with a cast, magnetic or other non-laminated core structure.

The corrugated surface is also of great service in dissipating heat since it increases the available radiating surface as contrasted with a plain cylindrical casing. The corrugations also provide passages which may be utilized as ventilating conduits or ducts. To this end the rotor is provided with radial vanes or fan blades 14 at one end and with lateral ducts or passages 15 leading through the rotor, so that air is circulated through the passages 15 and around the windings and thence back to the opposite end of the casing through the passages provided in the corrugated casing, all as indicated by the arrows shown in Fig. 1.

In the case of motors of larger capacity requiring additional ventilation, suitable openings may be made in the corrugated casing so that air external to the motor can be passed through its interior and other ventilating arrangements may be employed to increase the circulation of air around the heated parts.

In order that the motor may be assembled on either floor, wall or ceiling, the design is such that the bearings may be filled with oil and the oil level indicated irrespective of the position in which the motor may be held. To this end each bearing is provided with four threaded openings three of which are closed by filling plugs 16 and the fourth of which is filled with an oil level indicator and drain plug 17. These plugs are interchangeable so that the indicator and drain plug 17 may be placed at the bottom of the bearing irrespective of whether the motor is mounted on floor, wall or ceiling. At each bearing the shaft bearing is provided with a lining piece 18 having openings 19 and communicating with a space 20. The latter may be filled with woolen waste or other suitable material and projects through the openings 19 into contact with the shaft 1.

The drain plug 17 consists of a tubular member threaded into the bearing wall and provided with one or more overflow openings 20 communicating with the hollow interior of the tube. When the bearing is filled with oil, its full condition is indicated by the overflow of the oil through the opening 20 and out of the projecting end of the tube. When this occurs, the open end of the tube is then closed by the threaded plug 22. When it is desired to drain the bearing, the entire tube with its threaded closure plug is unscrewed from its seat in the bearing wall, allowing the oil to drain through the threaded opening therein.

While I have herein shown and described for purposes of illustration one specific embodiment of the invention, it is to be understood that the same is not limited to the specific details herein shown or to the particular form and relative arrangement of parts herein adopted or to the specific method herein described for establishing stresses in the holder which effect the gripping contact between the latter and the contained magnetic core, but that extensive deviations may be made therefrom without departing from the spirit of the invention.

Claims:

1. A dynamo electric machine having a stator provided with an expansible holder and a magnetic core held within the grip of the holder.

2. A dynamo electric machine having a stator, a stator core and a casing, the latter having a free internal diameter less than the external diameter of the core.

3. A dynamo electric machine having a magnetic core and a holder for the core capable of circumferential stretching, the core being held gripped within the holder.

4. A dynamo electric machine having a corrugated holder and a magnetic core held confined within the holder.

5. A dynamo electric machine having a stator comprising a casing and a magnetic core held gripped within the casing, the internal free diameter of the casing being different from the external diameter of the core.

6. A dynamo electric machine having a stator comprising a holder and a core, the latter held gripped circumferentially under a limited pressure by the holder through the inherent flexibility thereof, said holder being adapted to yield before a sufficient pressure is reached to deform the core.

7. A dynamo electric machine having a stator comprising a casing and a core, the latter having sheet metal members assembled and held tightly within the casing at a plurality of points of gripping contact.

8. A dynamo electric machine having a stator comprising an elastic casing and sheet metal members assembled and held tightly gripped at their edges by the casing.

9. A dynamo electric machine having a stator comprising a casing and sheet metal members assembled and held tightly gripped within said casing, the latter being corrugated to permit a slight symmetrical expansion when the annular members are forced into position within the same.

10. A dynamo electric machine having a stator comprising a corrugated casing, sheet metal members assembled and pressed together, clamping devices engaging the faces of the outside members to hold the same assembled, said members being held gripped at their peripheries in said corrugated casing, and end shields secured to the edges of the casing.

11. A dynamo electric machine having a stator comprising a corrugated casing, assembled sheet metal members and clamping devices to hold said members tightly together, said members being held gripped at their peripheries in said corrugated casing.

12. A dynamo electric machine having a stator comprising sheet metal members, a plurality of clamping yokes to hold them assembled and pressed together face to face, and an expansible casing into which they are pressed to hold them gripped at their peripheries.

13. A dynamo electric machine having a core with a surrounding corrugated casing and means for forcing air through the channels formed by the said corrugations.

14. A dynamo electric machine having a magnetic core provided with an indented periphery and a corrugated holder within which the core is held confined, the corrugations of said holder registering with the indentations of the core.

15. A dynamo electric machine having a magnetic core and a holder within which the core is held gripped, said holder being capable of circumferential stretching and engaging the core at peripheral depressions therein.

16. A dynamo electric machine having a stator comprising a non-circular casing and sheet metal core members, the latter being gripped at separated points on their edges by deformation of the casing.

17. The method of assembling the elements of a stator which consists in pressing together the sheet metal members composing the same, clamping them while held pressed and forcing them into an elastic casing and at the same time slightly symmetrically expanding the casing and holding them by the elasticity of the casing.

18. The method of assembling the core and surrounding holder of a dynamo electric machine which consists in placing the core within the holder and altering the circumferential dimension of one of said members to produce a gripping contact between the same.

19. The method of assembling the core and holder of a dynamo electric machine which consists in placing the core within the holder and thereby symmetrically stretching the holder to cause it to grip the core by its inherent elasticity.

20. The method of assembling the laminated core and the casing of a dynamo electric machine which consists in assembling and holding together the laminated members of the core, placing the core within the casing, altering the internal diameter of the casing and establishing stresses which cause the casing to grip and hold the core by its edges.

21. The method of assembling the core and its holder in a dynamo electric machine which consists in forming the casing with an internal diameter approximating but different from the external diameter of the core, expanding the holder and placing the core within the same and holding the core in place by the elastic grip of the expanded holder.

In testimony whereof, I have signed my name to this specification.

JOHN B. WIARD.